United States Patent
Lee

(10) Patent No.: US 9,411,685 B2
(45) Date of Patent: Aug. 9, 2016

(54) PARITY CHUNK OPERATING METHOD AND DATA SERVER APPARATUS FOR SUPPORTING THE SAME IN DISTRIBUTED RAID SYSTEM

(71) Applicant: Electronics and Telecommunications Research Institute, Daejeon (KR)

(72) Inventor: Sang Min Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 14/244,388

(22) Filed: Apr. 3, 2014

(65) Prior Publication Data

US 2015/0149819 A1    May 28, 2015

(30) Foreign Application Priority Data

Nov. 27, 2013    (KR) .................. 10-2013-0145137

(51) Int. Cl.
  *G06F 11/00*    (2006.01)
  *G06F 11/10*    (2006.01)

(52) U.S. Cl.
  CPC .... *G06F 11/1076* (2013.01); *G06F 2211/1028* (2013.01)

(58) Field of Classification Search
  CPC ............ G06F 11/1076; G06F 11/1084; G06F 11/1096
  See application file for complete search history.

(56) References Cited

U.S. PATENT DOCUMENTS

| | | | | |
|---|---|---|---|---|
| 5,574,882 A * | 11/1996 | Menon | ................ | G06F 11/1076 711/114 |
| 5,765,183 A * | 6/1998 | Kojima | ............... | G06F 11/1076 711/114 |
| 6,446,237 B1 * | 9/2002 | Menon | ................ | G06F 11/1076 714/6.11 |
| 7,779,294 B2 * | 8/2010 | Corrado | ............. | G06F 11/1076 711/114 |
| 7,831,768 B2 * | 11/2010 | Ananthamurthy | .. | G06F 11/1076 711/114 |
| 8,103,903 B2 * | 1/2012 | Hafner | ................ | G06F 11/1076 711/114 |
| 2008/0133967 A1 | 6/2008 | Lee et al. | | |
| 2011/0208912 A1 * | 8/2011 | Chambliss | .......... | G06F 11/1076 711/114 |
| 2012/0151255 A1 | 6/2012 | Lee et al. | | |

\* cited by examiner

*Primary Examiner* — Joseph Kudirka

(74) *Attorney, Agent, or Firm* — Rabin & Berdo, P.C.

(57) ABSTRACT

The present invention relates to operating a parity chunk, and a parity chunk operating method, in an environment dividing data of a file by a chunk unit, constituting a stripe by calculating a parity for a failure recovery, dispersely storing a data chunk and a parity chunk included in the stripe in multiple data servers, comprising the steps of: storing a data chunk and a parity chunk of a stripe structure in data servers; generating a partial parity using a previous data chunk in the storing step of a update data chunk by the data server storing the data chunk; and transmitting a partial parity to the data server storing the parity chunk, and a data server apparatus for supporting the same are disclosed.

20 Claims, 14 Drawing Sheets

PARITY CHUNK OPERATING METHOD AND DATA SERVER APPARATUS FOR SUPPORTING THE SAME IN DISTRIBUTED RAID SYSTEM

CROSS-REFERENCE TO RELATED APPLICATIONS

This application claims priority to and the benefit of Korean Patent Application No. 10-2013-0145137 filed in the Korean Intellectual Property Office on Nov. 27, 2013, the entire contents of which are incorporated herein by reference.

TECHNICAL FIELD

The present invention relates to a distributed RAID (Redundant Array of Inexpensive Disks) system which is operated by dispersely storing data in multiple data servers, more specifically, a parity chunk operating method and data server apparatus for supporting the same in distributed RAID system supporting a parity chunk and partial parity chunk management.

BACKGROUND ART

In general, non-symmetric clustered file system is the file system which a metadata server (MDS) that manages the metadata of files, multiple data server (DS) that manage data of a file, and multiple client systems that store and access a file are connected on Ethernet network and operated as a communication protocol.

Multiple data servers are provided as a single storage, and can be managed as a free storage space by adding/deleting a data server or a volume in a data server. Thus, in the system managing multiple data servers, considering the failure rate that is proportional to the number of servers, a method distributing data like RAID level 5 and preparing a parity for a recovery or a mirroring method preparing a replica of the data, etc can be used. Here, while mirroring technology has a low efficiency due to duplication of data, a data distributed storage structure using a parity has a relatively high efficiency and can meet fault tolerance and so it is preferable.

A data distributed storage structure using a parity ensures the availability of data if a data failure occurs. For example, configuring a stripe with multiple parity chunks and parities generated from them, even if a failure occurs in the data chunk at the same time by the number of parities generated, a recovery is possible without losing data. On the other hand, in the prior, a partial parity generated before updating the data is managed in a local storage such as a data chunk. Thus, the conventional method is efficient in write performance aspect by reducing the time calculating and storing a partial parity. However, if a failure occurs in the data server which a partial parity chunk is stored before update of a parity, the updated part of the data chunk can be might difficult to recover. Also, in degraded read or degraded write processing for failure data, first, to check for updates of parity, check a partial parity chunk from a remote server, if necessary, since it is necessary to read a partial parity from the remote server and to process the parity update, a overhead on the network occurs, the performance of degraded mode also deteriorate. Therefore, conventional methods, there is a problem that the performance degradation of the input and output of data is sustained until the restoration of failure.

SUMMARY OF THE INVENTION

The various embodiments of the present invention are for providing a parity chunk operating method and data server apparatus for supporting the same in distributed RAID system which stores and manages a partial parity generated for each updated data in a data server that stores a parity chunk.

A data server apparatus according to the embodiment of the present invention, in an environment dividing data of a file by a chunk unit, constituting a stripe by calculating a parity for a failure recovery, dispersely storing a data chunk and a parity chunk included in the stripe in multiple data servers, the apparatus comprises: a communication unit for receiving the data chunk constituting the stripe; a storage for storing the data chunk; and a control unit for calculating a partial parity by performing a operation between a previous data chunk and a update data chunk if the update chunk is received, and transmitting the calculated partial parity to a server apparatus which manages the parity chunk constituting the stripe.

The control unit may controls allocating a buffer for storing the update data chunk and a buffer for storing the previous data chunk.

The control unit calculates the resulting value of a XOR operation between the update data chunk and the previous stored data chunk as the partial parity, and controls return of the allocated buffers after calculating the partial parity.

The control unit defines a data chunk identifier as a name of the partial parity.

Also, a data server apparatus according the present invention in an environment dividing data of a file by a chunk unit, constituting a stripe by calculating a parity for a failure recovery, dispersely storing a data chunk and a parity chunk included in the stripe in multiple data servers, the apparatus comprising: a communication unit for receiving the parity chunk constituting the stripe; a storage for storing the parity chunk; and a control unit for receiving a partial parity calculated by performing a operation between a update data chunk and a previous data chunk, and storing and managing it, is disclosed.

The control unit controls storing the partial parity by allocating a buffer for receiving the partial parity, locking an access to a corresponding partial parity chunk file, and releasing an access restriction for the partial parity chunk file after storing the partial parity stored in the buffer in a corresponding segment region of a chunk data region.

The control unit controls returning the allocated buffers to a memory and returning a response to a corresponding partial parity transmitting request.

The control unit performs adjusting a segment information array by extending a segment region, inserting a segment, adding a new segment, or merging with a previous segment in storing the partial parity in the segment region.

The control unit updates the parity chunk using the partial parity.

The control unit locks access to a parity chunk file when receiving a data read failure processing request from a client, transmits a recovered data for the remotely received data chunk after performing a parity update to the client, and releases the access restriction to the parity chunk file.

The control unit performs updating the parity when receiving a data write failure recovering request, and after recovering the previous data based on a update parity chunk, stores a new parity calculated by an operation of the previous data, update data and a current parity data.

A parity chunk operating method in an environment dividing data of a file by a chunk unit, constituting a stripe by calculating a parity for a failure recovery, dispersely storing a data chunk and a parity chunk included in the stripe in multiple data servers, the method comprising the steps of: storing a data chunk and a parity chunk of a stripe structure in data servers; generating a partial parity using a previous data chunk and a update data chunk in the storing process of the update data chunk by the data server storing the data chunk; and transmitting a partial parity to the data server storing the parity chunk is disclosed.

Wherein the generating step of a partial parity further comprises performing allocation of a buffer for storing the update data chunk and a buffer for storing the previous data chunk by the data server storing the data chunk.

Wherein the method further comprising the steps of: calculating a XOR operation result value between the update data chunk and the previous data chunk as a partial parity; and returning the buffer after calculating the partial parity.

Wherein the method further comprising the steps of: allocating and storing a buffer for receiving the partial parity by the data server storing the parity chunk; locking an access to a corresponding partial parity chunk file; storing the partial parity stored in the buffer in a segment region corresponding to a chunk data region; releasing a access restriction to the partial parity chunk file; and returning the allocated buffers to a memory and returning a response to a transmitting request of the partial parity.

Wherein the method further comprises the step of adjusting a segment information array including at least one of the steps of extending a segment region, inserting a segment, adding a new segment, and merging with a previous segment in the step of storing the partial parity in the segment region.

Wherein the method further comprises the step of updating the parity chunk using the partial parity.

Wherein the method further comprising the steps of: receiving a data read failure processing request from a client; locking access to a parity chunk file; recovering data for remotely received data chunks after updating the parity; and transmitting the recovered data to a client and releasing the access restriction to the parity chunk file.

Wherein the method further comprising the steps of: receiving a data write failure recovering request; performing the parity update; recovering the previous data based on the updated parity chunk; and storing a new parity calculated by operation of the previous data, update data, and current parity data.

DETAILED DESCRIPTION

Hereinafter, for the purpose of describing in detail enough to enable those skilled in the art to easily embody the concept of the present invention, by referring to the accompanying drawings, a most preferable embodiment will be described in relation to a file update processing manner for managing a parity chunk and partial parity chunk in same storage proposed in the present invention.

Figure 1:
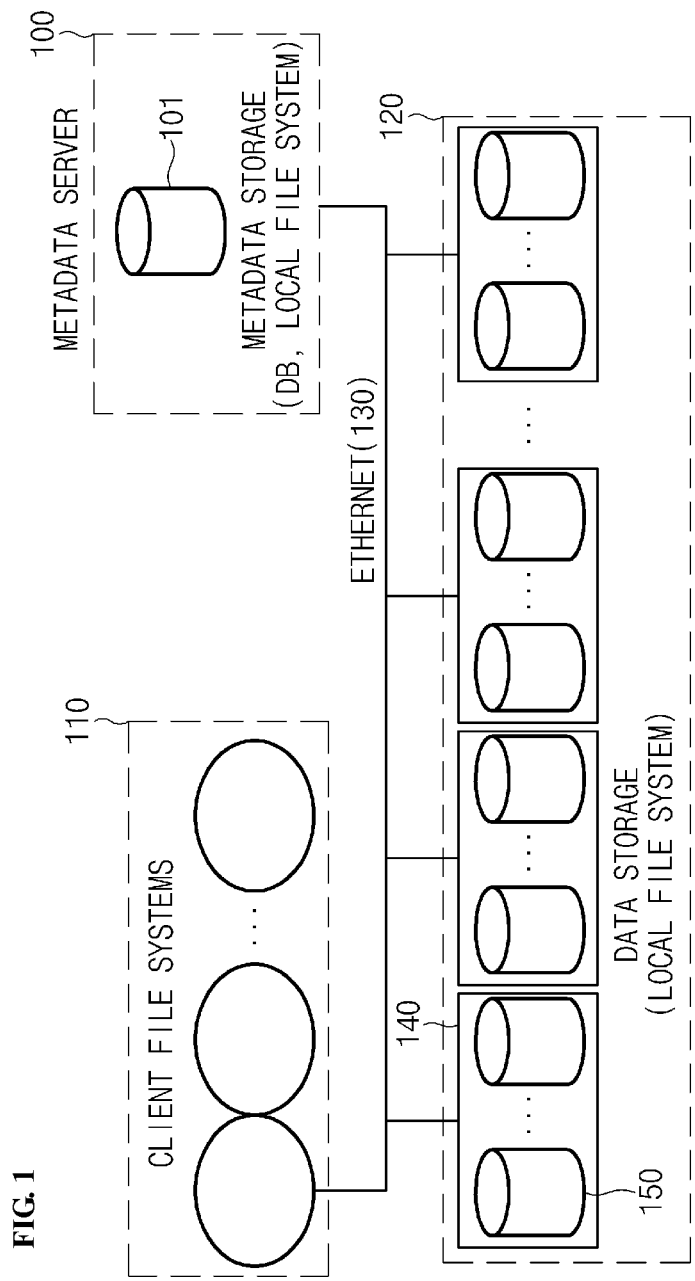
FIG. 1 is a diagram showing an asymmetric clustered file system structure associated with the present invention.

FIG. 1 is a diagram showing an asymmetric clustered file system structure associated with the present invention.

Referring to FIG. 1, an asymmetric clustered file system according to the present invention may include a client (110), a metadata server (100) and multiple data servers (120). And, the metadata server managing file metadata (100), the client accessing a file (110) and multiple data servers managing file data (120) are connected to a network (130), for example, Ethernet and interoperated via communication. A metadata server (100) utilizes a database or local file system (101) as a storage space to store the file metadata of the file system. A single data server (140) may include data storage (150) including one or more disk storage device, and the size of storage space is decided by the number of mounted disks. The data storage (150) storing a file data utilizes a local file system.

Figure 2:
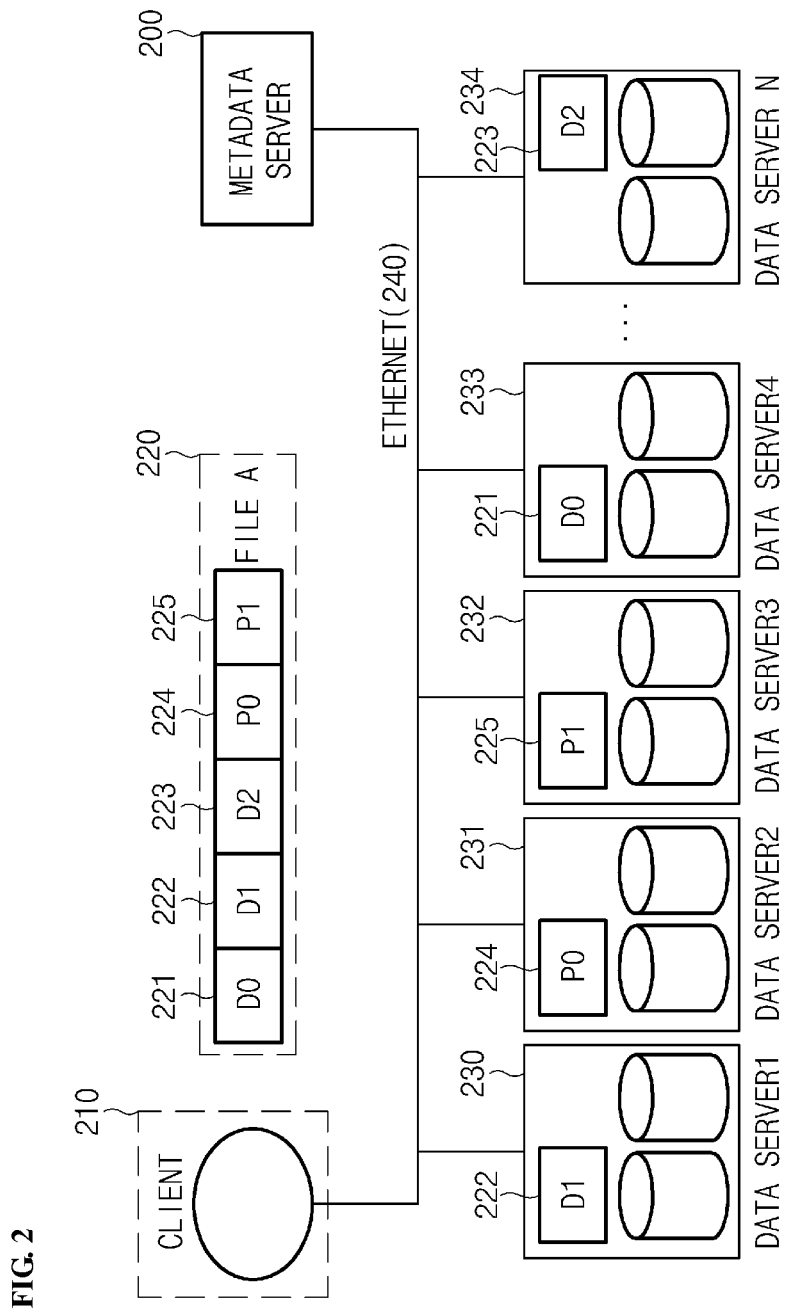
FIG. 2 is a diagram for explaining a distributed storage structure of data and parity in the asymmetric clustered file system associated with the present invention.

FIG. 2 is a diagram for explaining a distributed storage structure of data and parity in the asymmetric clustered file system associated with the present invention.

Referring to FIG. 2, a file A (220) in a client (210) is divided into a unit, called a "chunk". Here, the size of dividing is fixed in advance, or user to configure the file system may define the size such as the value calculated by dividing the size of a file by the number of the data servers (230, 231, 232, 233, 234) to be stored. A parity chunk (224,225) is generated for each of a predetermined number of data chunks (221, 222, 223). The definitions for the number of the generated parity chunks and the number of data chunks configuring a stripe can be decided by a user. The data server (230, 231, 232, 233, 234) storing a data chunk and a parity chunk is decided considering a storage utilization ratio etc. of each data server (230, 231, 232, 233, 234) in a metadata server (200), and the metadata server may notify the decision result to the client (210).

Figure 3:
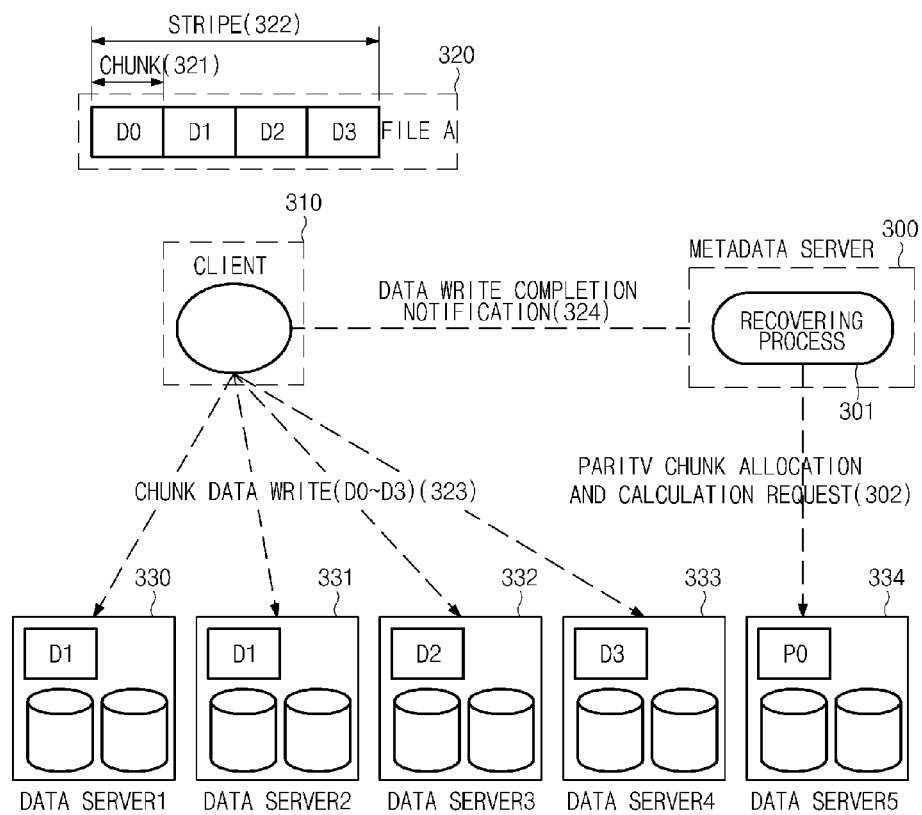
FIG. 3 is a diagram for explaining the operation of the system running an asynchronous parity update proposed in the present invention.

FIG. 3 is a diagram for explaining the operation of the system running an asynchronous parity update proposed in the present invention.

Referring to FIG. 3, a client (310) divides file A (320) to be written by a chunk (321) of a certain unit, concatenates the user-defined number of chunks into stripe (322), and dispersely stores them in the data servers known by metadata server (300). If the storing of the file is finished, the client (310) transmits a data writing completion notification message (324) to the metadata server (300).

The metadata server (300) stores the corresponding file, transferred through a data writing completion notification message, in a recovery queue managed by a recovery process (301), and returns a response to the client (310). In order to identify a file metadata information, the recovery queue stores a file identifier having uniqueness such as a file path name or file inode, etc.

The recovery process (301) can be operated in a type of a daemon thread or an independent process. The recovery process (301) perform the function to instruct allocating a parity chunk for a file stored in the recovery queue, requesting for generating a parity, etc. to a specific data server (302).

Figure 4A:
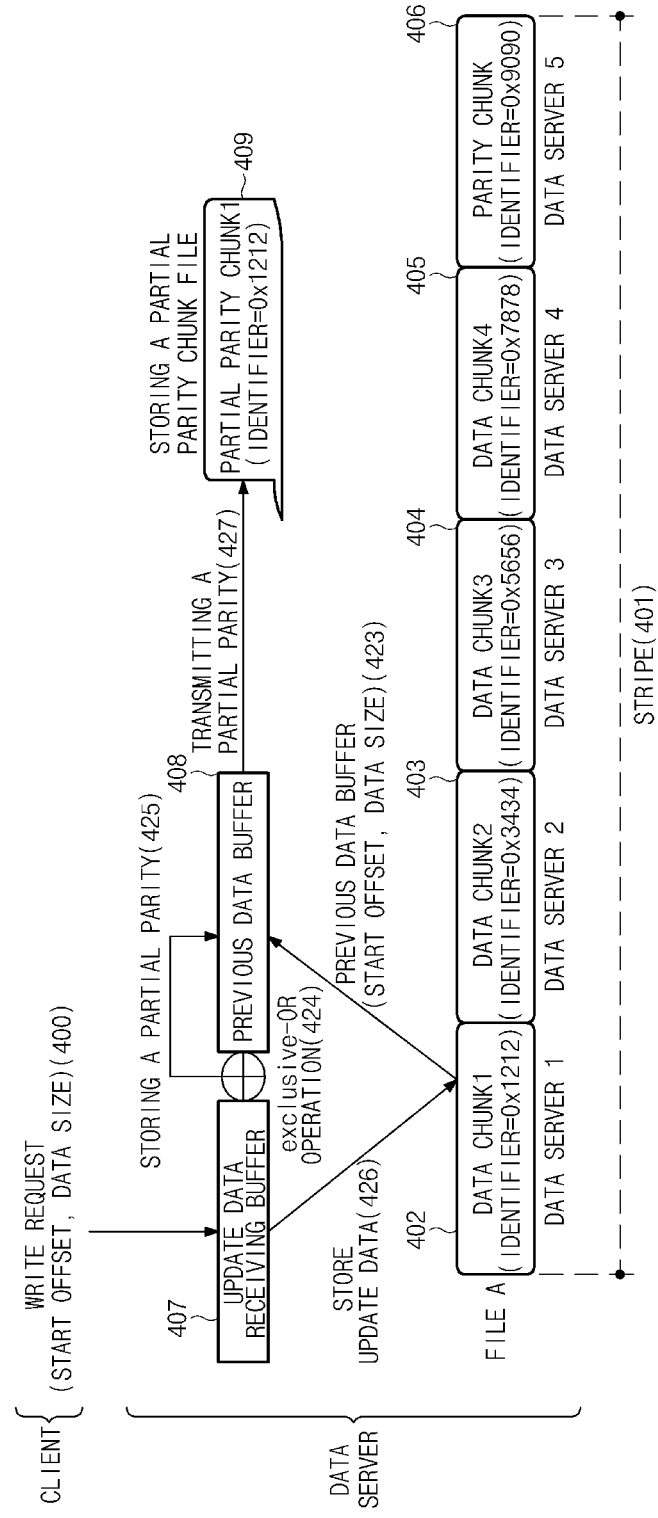
FIG. 4A is a diagram for explaining an update processing of data utilizing a partial parity proposed in the present invention.
Figure 4B:
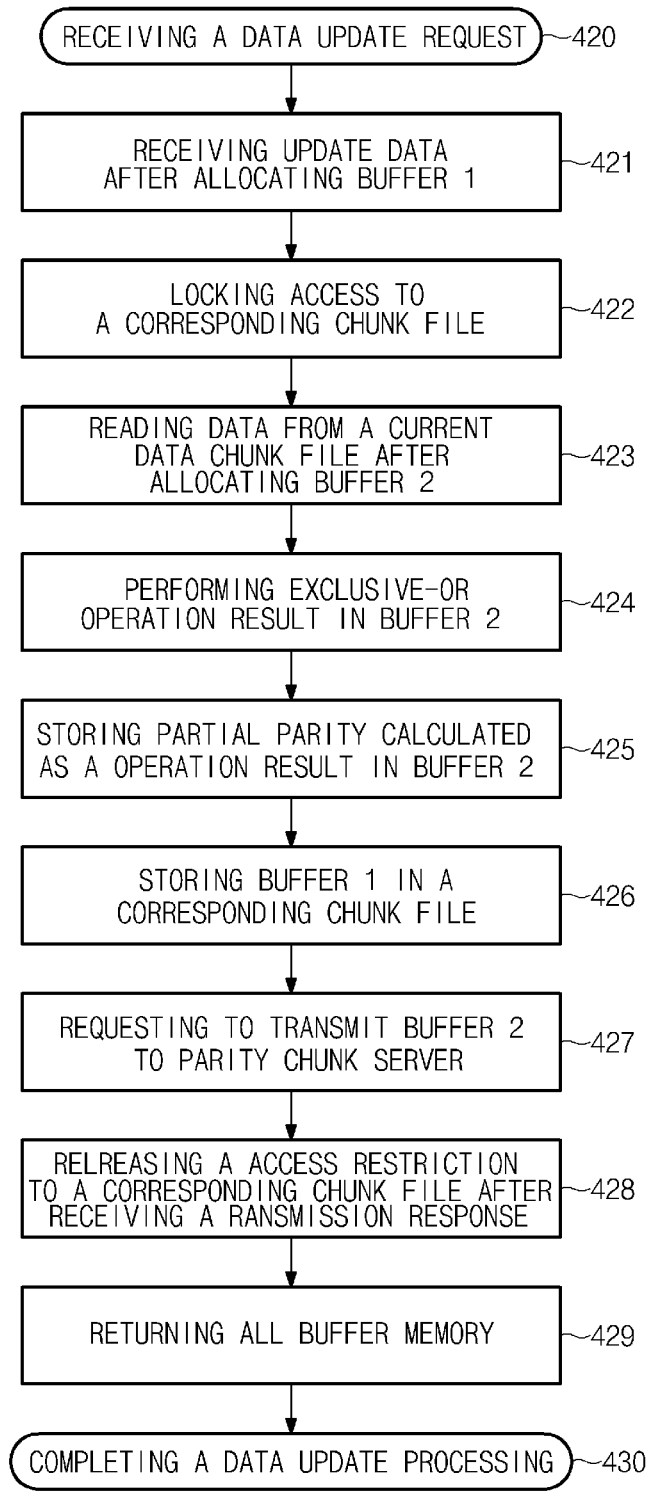
FIG. 4B is a flowchart of an update processing of data utilizing a partial parity proposed in the present invention.

FIG. 4A is a structure of update processing of data utilizing a partial parity proposed in the present invention and FIG. 4B is a processing flowchart.

With reference to FIG. 4A and FIG. 4B (420~430), the stripe (401) constituting the file A described in the previous drawings can be dispersely stored in data server 1 through 5 (402 through 406). Each chunk is stored in the local file system of corresponding data server with a file name of the unique identifier. A client transmits write request (400) start offset and data size including for a data chunk 1 (0x1212) to a data server through a network.

The data server 1 (402) receiving (420) a writing request (400) allocates a buffer 1 (407) corresponding to a update data receiving buffer, and using the allocated buffer 1, receives a data chunk from a client (421). If the reception is completed, data server 1 (402) restricts access to the data chunk file to be updated (422). And, the data server 1 (412) allocates buffer 2 (408) corresponding to the previous data buffer, reads data stored in the current data chunk file, and stores it in the allocated buffer 2 (423).

The data server 1 (402) perform XOR (exclusive-OR) operation for the data of the two buffers (407, 408)(424). If a partial parity is generated as the result of the operation, data server 1 (402) stores it in buffer 2 (408) corresponding to the previous data buffer (425). If the operation is completed, data server 1 (402) stores data of buffer 1 (407) corresponding to the update data receiving buffer in the corresponding data chunk file (426). The data server 1 (402) transmits a partial parity stored in the buffer 2 to the data server, in which a parity chunk is stored, for example, the data server 5 (406) through a network (427).

The data server 5 (406) storing the parity chunk performs a partial parity processing, and returns a response for it to the data server 1 (402). With reference to FIG. 6B, etc., the partial parity processing will be described in more detail below.

On the other hand, if the response is received from data, the data server 1 (402) releases the restriction for the updated data chunk file (428). And, data server 1 (402) returns the allocated buffers (407, 408) to a memory (429), thereby, completing the data update processing (430).

Figure 5:
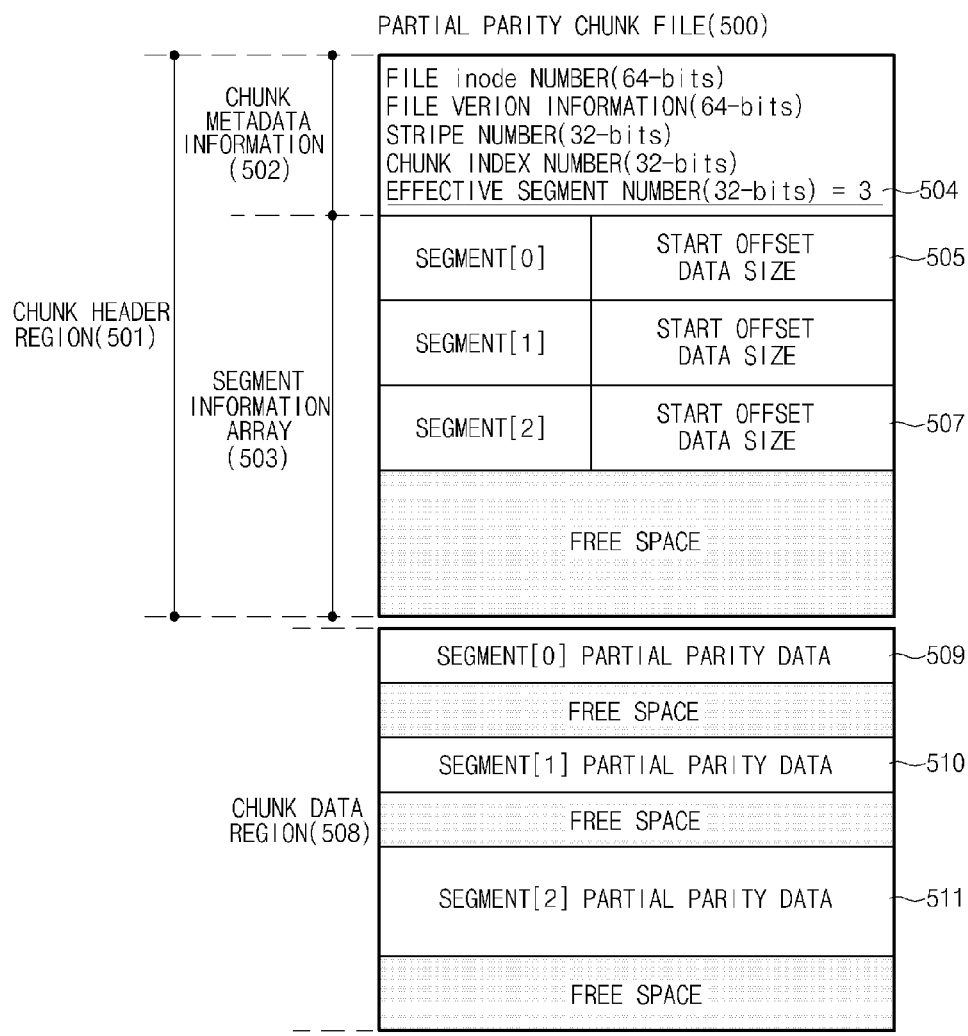
FIG. 5 is layout structure of a partial parity chunk file proposed in the present invention.

FIG. 5 is a drawing for explaining a layout structure of a partial parity chunk file proposed in the present invention.

Referring to FIG. 5, a layout (500) of a partial parity chunk file is largely is comprised of a chunk header region (501) and a chunk data region (508). The chunk header region (501) is stored in a head part of a file, and includes chunk metadata information (502) and a segment information array (503). The chunk metadata information (502) is comprised of a file Inode number (64 bits), a file version (64 bits), a stripe index (32 bits), a chunk index (32 bits), a number of effective segment (32 bits), etc. The segment information array (503) is an array of a segment information data structure (505 through 507) comprised of a segment start offset and a stored data size, the segment is not adjacent to each other, but, is aligned on the basis of the start offset in ascending order. The array size is decided by the number of effective segments among the meta-data information (504). The size of the chunk header region (501) can be decided depending on the size of the chunk data region (508) and the minimal size processing a partial parity.

The chunk data region (508) is the region in which a actual partial parity data is stored. The size of the chunk data region (508) is defined when constituting a volume storing a file in the metadata server. The position information of the segment (509 through 511), in which the partial parity data is stored, is managed by the segment information array (503). When accessing the chunk data region, the process of adjusting the offset of the actual file have to be preceded by considering the chunk header region (501) for size of (the file offset+the chunk header region).

Figure 6A:
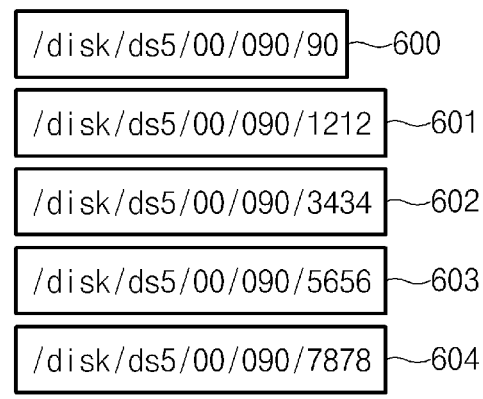
FIG. 6A is a storage structure of a parity and a partial parity chunk file proposed in the present invention.
Figure 6B:
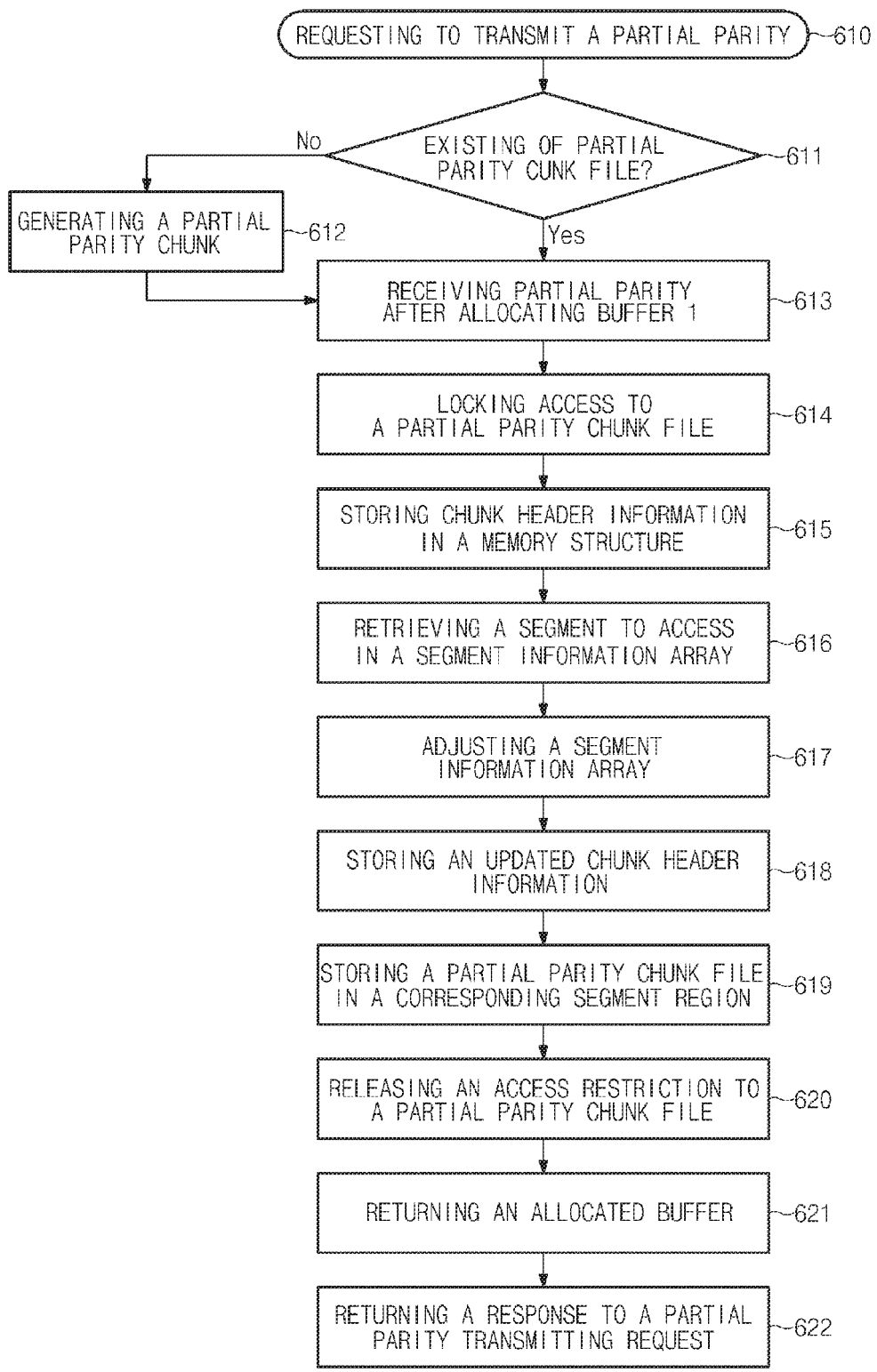
FIG. 6B is a flowchart of the transfer request of a partial parity proposed in the present invention.

FIG. 6A is a storage structure of a parity and a partial parity chunk file proposed in the present invention.

With reference to FIG. 4A and FIG. 6A, the "/disk/ds5" of (600) is the data storage path of the data server5 (406) storing the parity chunk file in file A of FIG. 4A, and managed by a local file system. Whenever chunks of the same stripe are updated, the generated partial parity is managed as an independent file in the same directory as the parity chunk file (600). The partial parity can be generated by using a data chunk identifier as a corresponding file name like 601 through 604. The partial parity is transmitted by a parity update process before being reflected in a parity, and is stored in the corresponding parity chunk file.

FIG. 6B is a flowchart of the transfer request of a partial parity proposed in the present invention.

With reference to FIG. 4A and FIG. 6B (610~622), if a partial parity transmitting request is received from a data server updating a data chunk (610), a data server managing a parity chunk, for example, data server 5, first of all, checks whether the corresponding partial chunk file exists or not (611). At this time, data server 5 searches a directory using a parity chunk identifier transferred with the request, and using a data chunk identifier, retrieves whether the partial parity file exists or not. If a file is not existed in the corresponding directory, data server 5 generates a partial parity chunk file by using the data chunk identifier as a file name (612).

And, data server 5 allocates buffer 1 corresponding to a partial parity receiving buffer, and after that, stores the received partial parity in buffer 1 (613). Since then, data server 5 locks access to the corresponding partial parity chunk file (614), reads the header information, and stores it in a memory structure (615). The data server 5 compare the segment information array stored in a memory with the size of the start offset and the data of a received partial parity, thereby retrieving the segment which have to access (616), if necessary, adjusting the segment information array (617). The segment information will be described in FIG. 6C.

Next, data server 5 stores the updated chunk header information of a memory in the corresponding parity chunk file (618), and stores a partial parity receiving buffer in the corresponding segment region of a chunk data region (619). When the storing is completed, data server 5 unlocks the access restriction for the partial parity chunk file (620). The data server 5 returns the allocated buffers to a memory (621), and returns a response to the partial parity transmitting request (622).

Figure 6C:
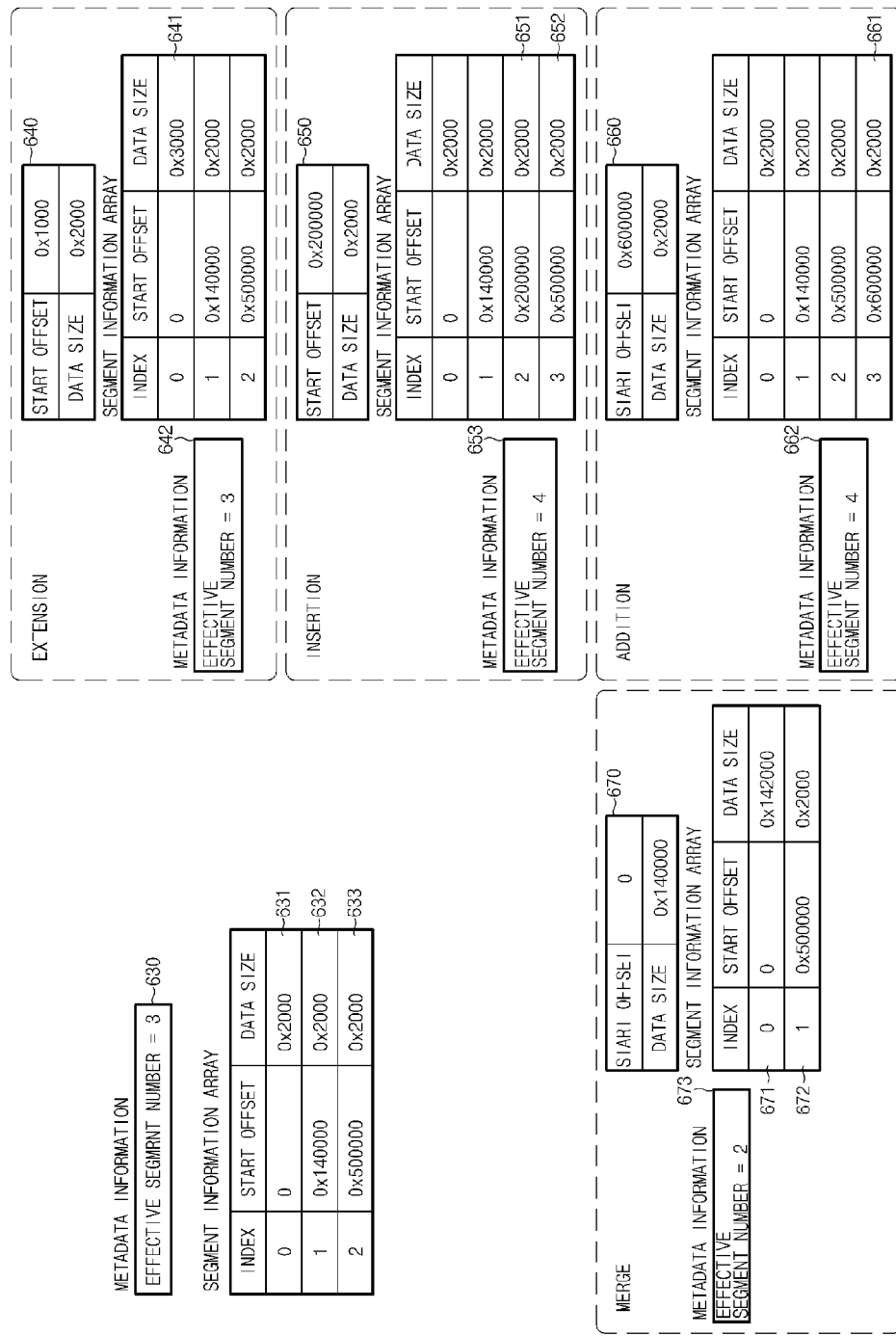
FIG. 6C is a diagram for explaining the segment management of a partial parity chunk file proposed in the present invention.

FIG. 6C is a structure of the segment management of a partial parity chunk file proposed in the present invention.

Referring to FIG. 4A and FIG. 6C, the data server managing a parity chunk may perform a segment management for a partial parity processing. At this time, the management functions of the data server are largely defined as a extension, insertion, addition and merge. For example, take it that a number of effective segments is 3 (630) and the partial parity chunk file, storing the segment information (631~633) for each array index, exists.

First, as an example of a extension, if the start offset of the transmitted partial parity region is 0x1000 and the size is 0x2000 (640), 0x1000 through 0x2000 of the segment [0] region are overlapped. Consequentially, the data server 5 extends the size of the segment [0] to 0x3000 (641). After the extension, although the number of the effective segments is maintained, information of a specific segment can be changed.

As an example of insertion, if the start offset of the transmitted partial parity region is 0x200000 and the size is 0x2000 (650), since the region is not the region which is using, the allocation of new segment is needed, and the position of storing is between segment [1] and segment [2]. Accordingly, the data server 5 moves information of the current segment [2] to the segment [3], stores it (652), and stores information of the newly allocated segment in the segment [2] (651). After inserting, the data server 5 increases the number of effective segment to 4 (653).

As an example of addition, if the start offset of the transmitted partial parity region is 0x600000 and the size is 0x2000 (660), since it is not adjacent to the last segment, the data server 5 add the new segment [3] and stores information (661). After adding, the data server 5 increases the number of the effective segments to 4 (662).

As an example of merge, if the start offset of the transmitted partial parity region is 0x0 and the size is 0x140000 (670), the data server 5 stores data from the segment [0] to the segment [1] without null space. Accordingly, the data server 5 merge information of the two segments into the segment [0], extend the size of data to 0x142000, moves the segment [2] to the segment [1], and stores it (672). After merging, the data server 5 decreases the number of the effective segments to 2 (673).

Figure 7A:
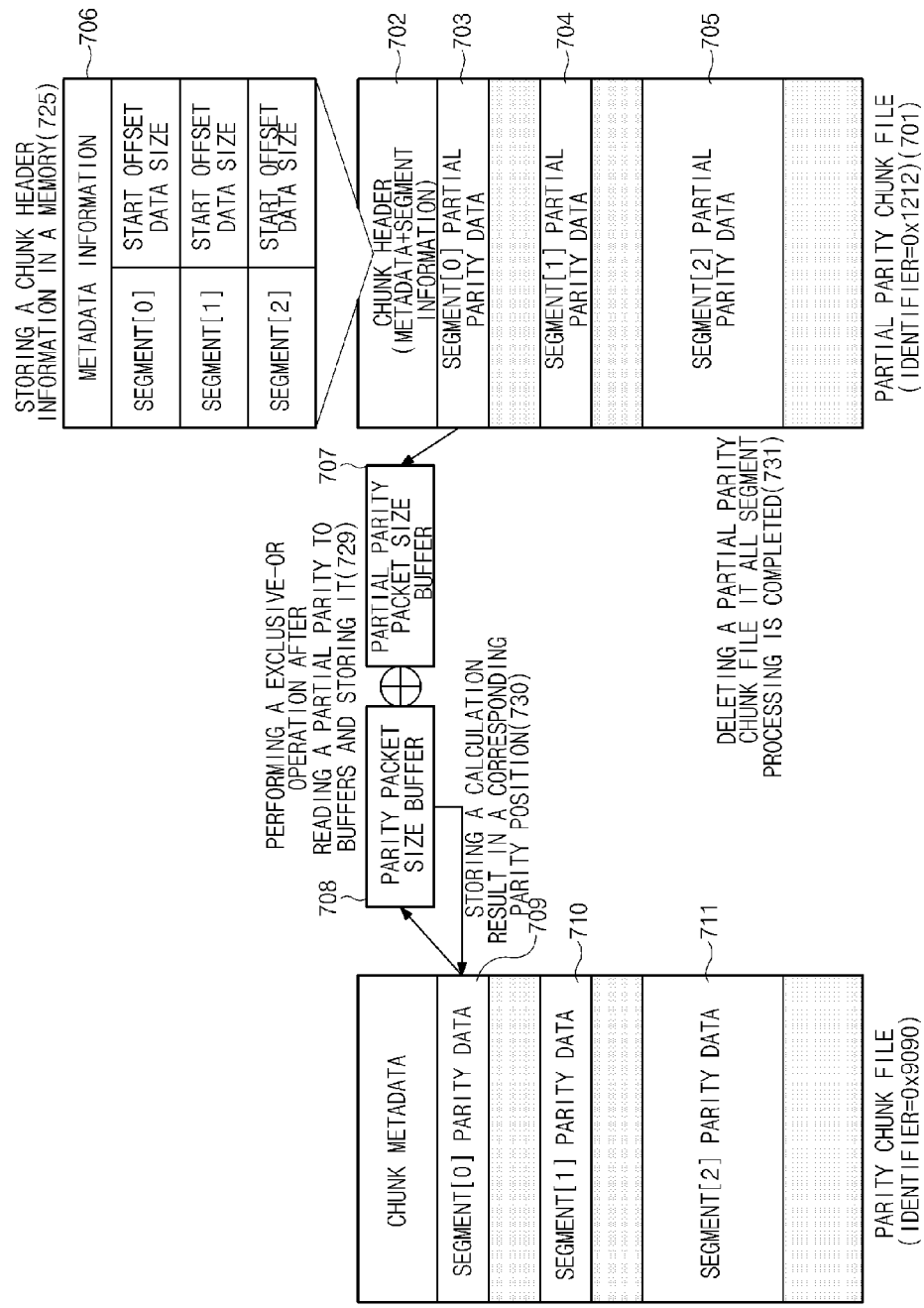
FIG. 7A is a diagram for explaining a parity update processing proposed in the present invention.
Figure 7B:
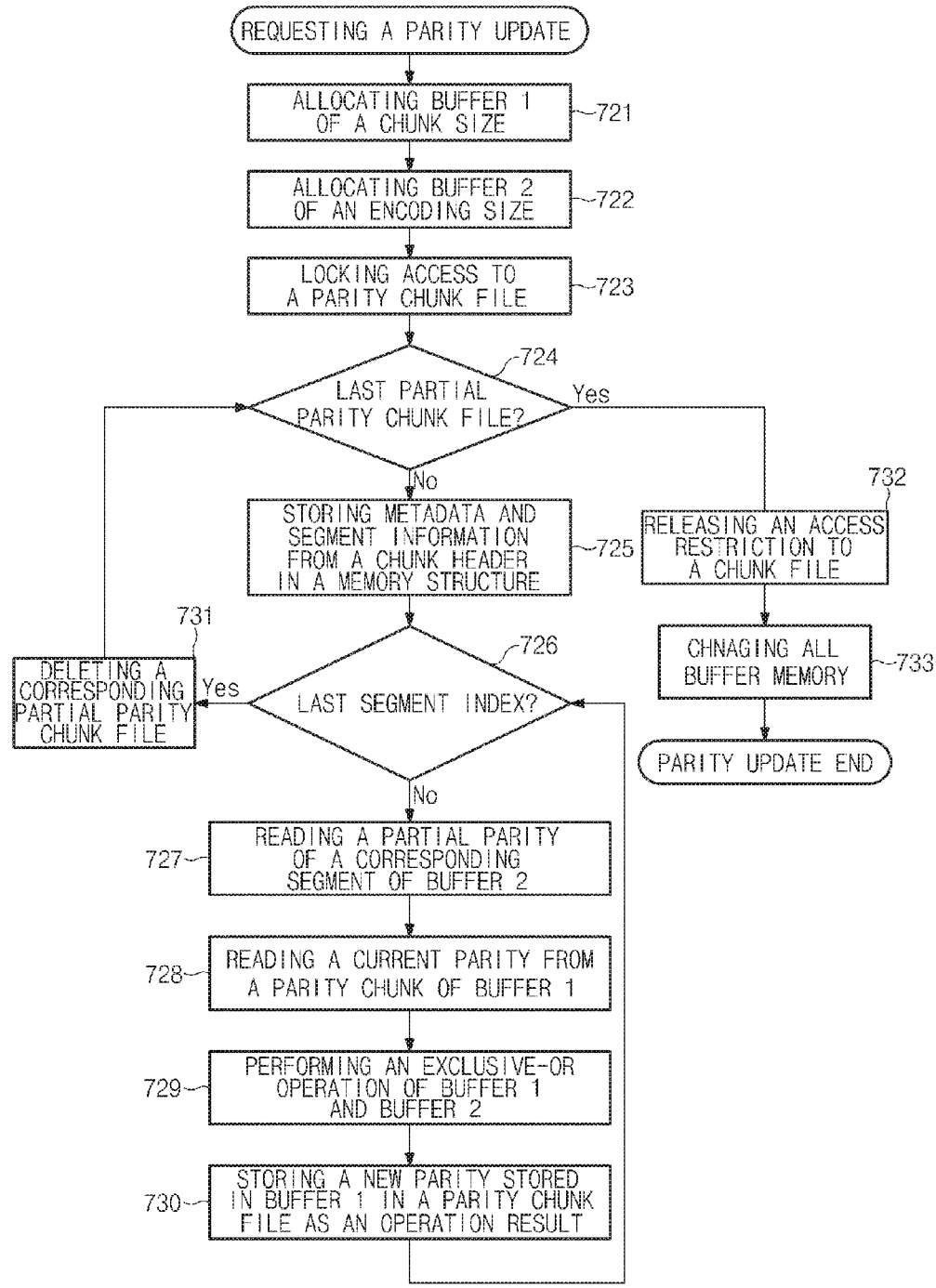
FIG. 7B is a flowchart of a parity update processing proposed in the present invention.

FIG. 7A is a structure of a parity update processing proposed in the present invention and FIG. 7B is a flowchart of the processing.

Referring to FIG. 4A, FIG. 7A and FIG. 7B (721~730), the parity update of the data server 5 managing a parity chunk includes the case processed by the request from a recovery process of a metadata server and the case processed by the transfer of the degraded read or degraded write request from a client depending on the failure of the data chunk. In either event, the process, which the partial parity chunk file exists and reflects it on a chunk file, is called a parity update.

First, the data server 5 allocates the buffer 2 (707) of the encoding size storing a partial parity and the buffer 1 (708) of the chunk size storing parity to a memory (721 and 722). And, the data server 5 locks access to a parity chunk file (723). Next, the data server 5 verifies that the current processed partial parity is the last partial parity chunk file. If it is not the last partial parity chunk file, the data server 5 stores the chunk header information of the partial parity chunk file in the memory structure (706) (725).

The data server 5 sequentially processes from the array of the segment information while verifying that the current processed segment has the last segment index (726), in the index size of the effective number of segments. If the current processed segment has not the last segment index, the data server 5 reads the parity data (709) of the offset identical to the partial parity data (703) from each of buffer 1 and buffer 2 (707, 708) (727 and 728). The data server 5 performs the XOR (exclusive-OR) operation for data stored in the two buffers (707, 708), and stores the calculated result in the parity buffer 1 (708)(729). After that, the data server 5 stores the calculated result stored in the parity buffer 1 (708) in the offset (709) corresponding to the parity chunk file (730).

The above described processes are performed for the remaining partial parity segments (704 and 705) and parity segment (710 and 711). If the size of the segment exceeds the size of the defined buffer, it is performed by dividing into a unit of buffer size. If the parity update is completed for all segments, the data server 5 deletes the corresponding partial parity chunk file (701) (731). The data server 5 performs the above described update process for all partial parity chunk files (724), if completed, releases the restriction of access for the parity chunk file, and returns all buffers to a memory (733).

Figure 8A:
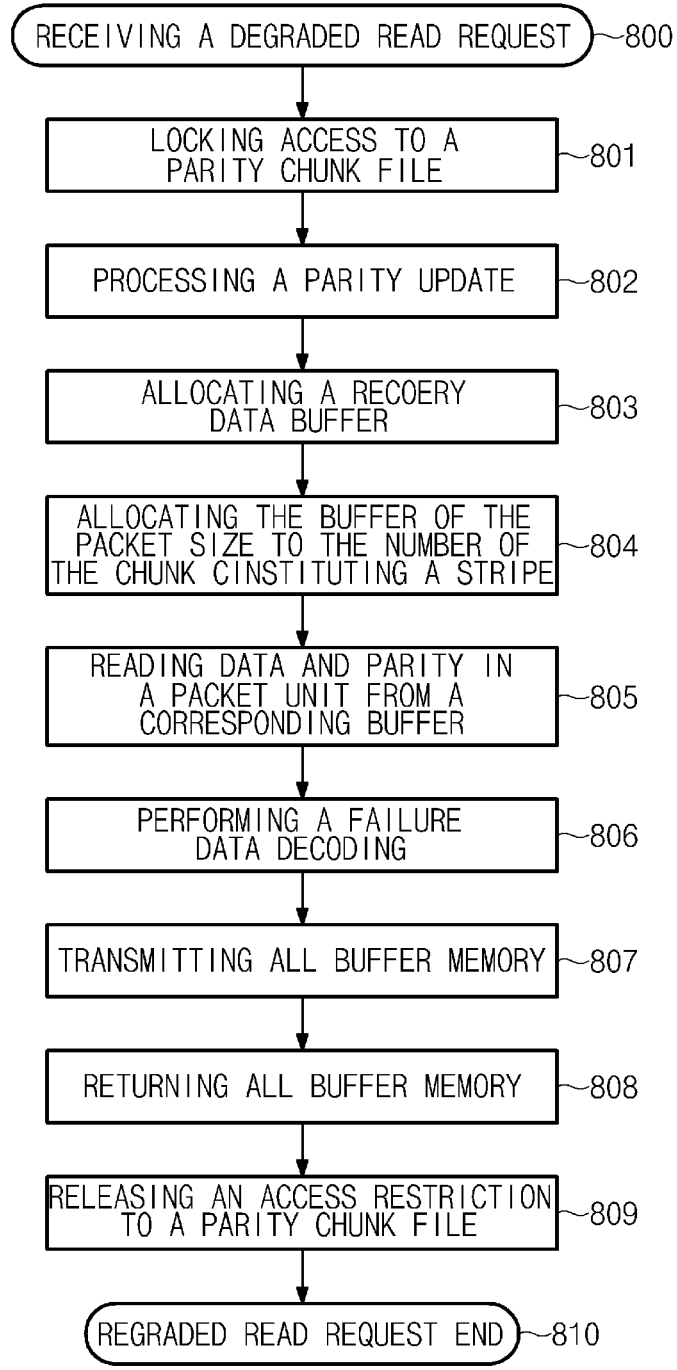
FIG. 8A is a flowchart of a Degraded read processing in the system proposed in the present invention.

FIG. 8A is a flowchart of a Degraded read processing in the system proposed in the present invention.

Referring to FIG. 4A, FIG. 7A, FIG. 7B and FIG. 8A (800~810), if a client detects a data chunk failure on reading process, it transfers a degraded read request to the data server 5 storing the parity chunk of the same stripe. Then, the data server 5 storing the parity chunk receives the degraded read request (800). Thus, the data sever 5 locks access to the corresponding parity chunk file (801). And, the data server 5 firstly updates data of the parity chunk file and performs the parity update by the method described in FIGS. 7A and 7B (802). The data server 5 allocates a recovery data buffer capable of storing the recovered failure data (803), and allocates the receiving buffer of the packet size to the number of the remaining data chunk constituting a stripe (804). And, the data server 5 remotely requests the data chunks to the data server storing the corresponding data chunk, stores the received data chunk in each buffer, and recovers the failure data by performing a decoding operation with reading the parity from the parity chunk file of the local disk in a packet unit (805)(806). After that, the data server 5 transmits the recovered data to the client (807), and returns all buffers to a memory (808). The data server 5 terminates the degraded read request by releasing (809) the access restriction for the parity chunk file (810).

Figure 8B:
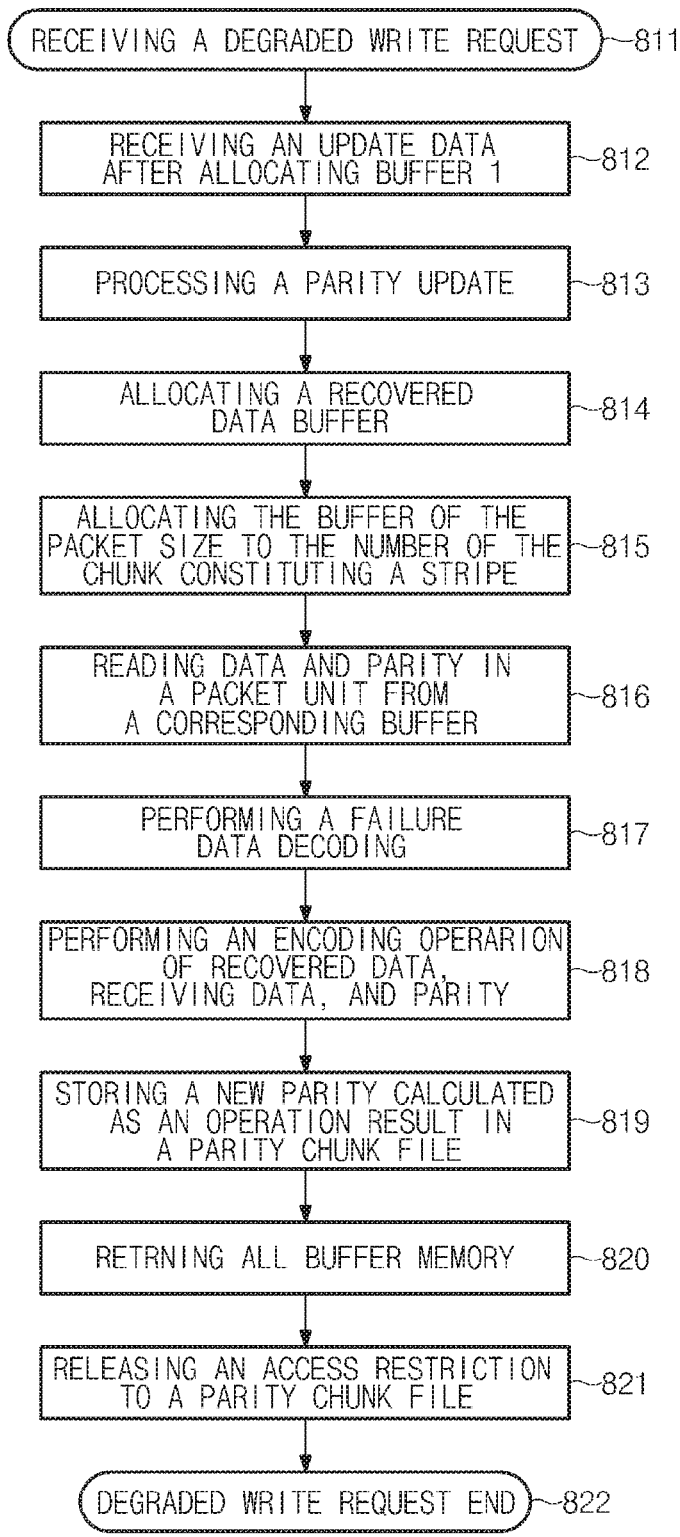
FIG. 8B is a flowchart of a Degraded write processing in the system proposed in the present invention.

FIG. 8B is a flowchart of a Degraded write processing in the system proposed in the present invention.

Referring to FIG. 4A, FIG. 7A, FIG. 7B, FIG. 8B (811~822), if a client detects a data chunk failure on writing process, it transfers a degraded write request to the data server 5 storing the parity chunk of the same stripe. Then, the data server 5 storing and managing the parity chunk receives the degraded write request (811). If it receives the request, the data server 5 allocates the buffer 1 which update data is to be received, and receives the update data using the buffer 1 (812). And, the data server 5 firstly updates data of the parity chunk file and performs the parity update processing by the method described in FIGS. 7A and 7B (813).

And, the data server 5 allocates a recovery data buffer capable of storing the recovered failure data (814), and allocates the receiving buffer of the packet size to the number of the remaining data chunk constituting a stripe (815). The data server 5 remotely requests the data chunks, stores the received data chunk according the request in each buffer, and recovers the failure data by performing a decoding operation with reading (816) the parity from the parity chunk file of the local disk (817). The recovered data is old data of the received update data. The data server 5 performs a encoding operation by using the recovered old data, the received update data and the current parity data (818). The data server 5 stores the new parity calculated as the result of the operation in the parity chunk file (819). After that, the data server5 (406) returns all buffers to a memory (820), and terminates the degraded write request by releasing (821) the access restriction for the parity chunk file (822).

Figure 9:
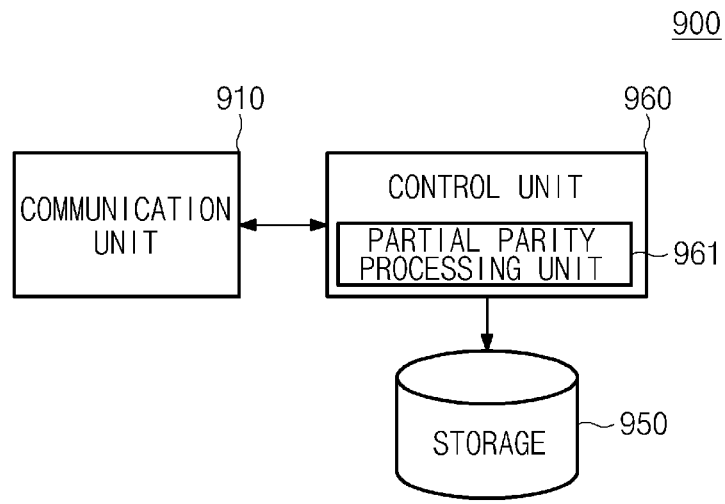
FIG. 9 is a constitution diagram of a data server device to perform the data management to be proposed in the present invention.

FIG. 9 is a constitution diagram of a data server device to perform the data management to be proposed in the present invention.

Referring to FIG. 9, the data server apparatus 900 stored in a data chunk of the present invention can be at least one of the data servers 1, 2, 3 and 4 previously described in FIG. 4A. This data server apparatus 900 may includes a communication unit 910, a control unit 960 and a storage 950.

If the data server apparatus, having the above constitution, receives a data update request from a client, the apparatus may generate a partial parity based on the previous data chunk and update data chunk, and transfer it to the data server apparatus managing a parity chunk.

For this, the communication unit 910 may form the communication channel between a client and the data server apparatus managing a parity chunk. The communication unit 910, for example, may constitute as a module supporting Ethernet communication. The communication unit 910 may receive a data chunk and update data chunk. And, the communication unit 910 may perform the transmission of a partial parity generated in a data chunk update process.

A storage 950 may store a data chunk. If the storage 950 receives an update data chunk from a client, it can replace the previous stored chunk with the update data chunk. The data chunk stored in the storage 950 can be retrieved and transferred depending on a request of a client. If a failure is generated, the storage 950 can support a data recovery read or write according to the processing of a data server.

The control unit 960 can support a signal processing and data processing for operating a data server. For example, the control unit 960 can store the data chunk from a client in a storage 950. Also, the control unit 960 can provide the data chunk stored in a storage 950 with a client according to the request of the client. Also, the control unit 960 can provide a data chunk according to the request of the data server storing and managing a parity chunk. Specially, the control unit 960 may include a partial parity processing unit 961. The partial parity processing unit 961 can process the generation and transmission of a partial parity. Explaining this in more detail, the partial parity processing unit 961 may control a buffer for storing an update data chunk and a buffer allocation for storing a previous data chunk. And, the partial parity processing unit 961 may calculate the partial parity through the XOR operation of an update chunk and a previous data chunk. The partial parity processing unit 961 may transfer the calculated partial parity to the data server managing a parity chunk. At this time, the partial parity processing unit 961 may verify the position information of the data server by the metadata server, or receive it from the metadata server in the process storing a data chunk in advance. The partial parity processing unit 961 may control the return of the allocated buffers after the partial parity calculation and transmission.

Figure 10:
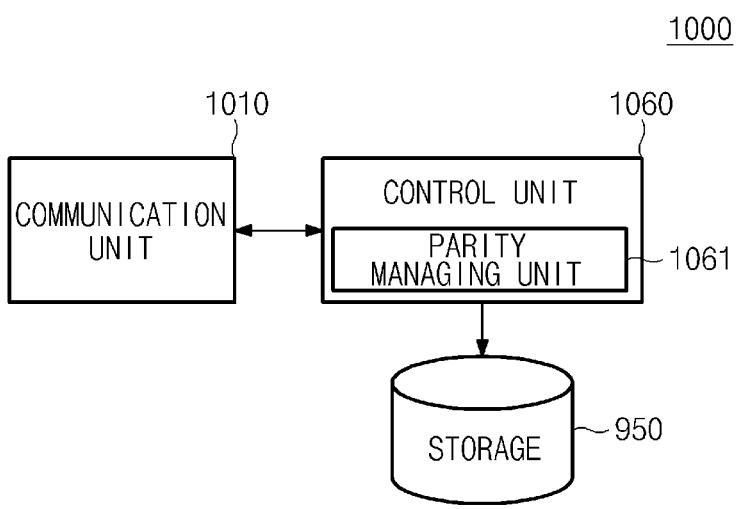
FIG. 10 is a constitution diagram of a data server device that runs the parity operation to be proposed in the present invention.

FIG. 10 is a constitution diagram of a data server device that runs the parity operation to be proposed in the present invention.

Referring to FIG. 10, a data server apparatus 1000 storing a parity chunk of the present invention can be the data server 5 (406) described in FIG. 4A in advance. This data server apparatus 1000 may include a communication unit 1010, a storage 1050 and a control unit 1060.

The data server apparatus 1000 of the above constitution for storing and managing a parity chunk can store a parity chunk of chunks transferred by a client. And, the data server apparatus 1000 can receive a partial parity from a data server apparatus 900. The data server apparatus 1000 can store and manage the received partial parity. At this time, the data server apparatus 1000 can update the previously stored parity chunk using a partial parity.

The communication unit 1010 can perform the communication function of the data server apparatus storing and managing a parity chunk. The communication unit 1010 can form a communication channel with a client and receive a parity chunk from the client. Also, the communication unit 1010 can receive a data failure recovery request from a client. The communication unit 1010 can transfer the recovered data to the client or to the corresponding data server apparatus.

The storage 1050 can store a parity chunk. The storage 1050 can temporarily store a partial parity chunk. The storage 1050 can store the parity chunk updating data based on a partial parity chunk. The storage 1050 can be used as a buffer capable of temporarily storing a data chunk in a data recovery process.

The control unit 1060 can control the processes for storing a parity chunk, receiving a partial parity, applying the received partial parity and recovering, etc. For this, the control unit 1060 can include a parity managing unit 1061 for managing a parity. The parity managing unit 1061 can perform the process of the partial parity transmission request by the data server apparatus 900 storing a data chunk, the function for managing a segment, the function of a parity update processing and the operation and response return of a data chunk and a parity chunk for a degraded read or degraded write. Explaining this in more detail, the parity managing unit 1061 can perform allocating a buffer for receiving a partial parity. And, the parity managing unit 1061 can verify the position for updating by verifying the identifier information of a partial parity chunk, and update the parity chunk of the corresponding position. Also, if the parity managing unit 1061 receives a data failure recovery request from a client, it can perform controlling of degraded read or degrade write described in the above drawings.

On the other hand, although each of the data server apparatus storing a data chunk and the data server apparatus is individually described in FIG. 9 and FIG. 10, the present invention is not limited with this. In other words, a data server apparatus can store and manage one of a data chunk or a parity chunk in a process selected by a metadata server. Accordingly, even if the data server apparatus is designed to store a data chunk, if necessary, it can store a parity chunk and support operating of the corresponding parity chunk. Also, even if the data server apparatus is designed to store a parity chunk, if necessary, it can perform a role which stores a data chunk, calculates a partial parity and transfers it to other data server apparatus storing a parity chunk. Thus, the above described data server apparatus can be designed to support at least one of the function storing and operating a data chunk and the function storing and operating a parity chunk.

As described above, according to a parity chunk operating method and a data server apparatus for supporting the same in a distributed RAID system of the present invention, it is possible to prevent performance degradation in a minimal network overhead, by storing and managing a partial parity and parity chunk in same data server. Further, the present invention may prevent loss of update data due to a failure before update of a parity and improve availability. Also, according to the present invention, it is possible to improve the degraded input and output processing performance by updating a parity without additional network overhead, because all partial parity processing, necessary to parity update preceded in the degraded input and output processing, are managed in same storage as a parity chunk.

The preferred embodiment of the present invention, the above described, is for the purpose of illustration, various corrections, modifications, alternatives and additions will be possible to those skilled in the art through the sprit and the scope of the appended claims, and it should be interpreted that these corrections, modifications, etc. are included in the following claims.

What is claimed is:

1. A data server apparatus in an environment dividing data of a file by a chunk unit, constituting a stripe by calculating a parity for a failure recovery, dispersedly storing a parity chunk and a data chunk included in the stripe in multiple data servers, the apparatus comprising:
   a communication unit for receiving the data chunk constituting the stripe;
   a storage for storing the data chunk; and
   a control unit for calculating a partial parity by performing an operation between a previous data chunk and an update data chunk if the update data chunk is received, and transmitting the calculated partial parity to a data server which manages the parity chunk constituting the stripe,
   wherein the partial parity and the parity chunk are stored and managed in a same data server,
   wherein each data chunk of the file and each parity chunk are stored in each different data server, and
   wherein storing the data chunk in the storage and transmitting the partial parity to the data server which manages the parity chunk constituting the stripe are performed by different processes in a same server.

2. The data server apparatus of claim 1, wherein the control unit controls allocating a buffer for storing the update data chunk and a buffer for storing the previous data chunk.

3. The data server apparatus of claim 2, wherein the control unit calculates the resulting value of an exclusive-OR (XOR) operation between the update data chunk and the previous data chunk as the partial parity.

4. The data server apparatus of claim 3, wherein the control unit controls return of the allocated buffers after calculating the partial parity.

5. The data server apparatus of claim 1, wherein the control unit defines a data chunk identifier as a name of the partial parity.

6. A data server apparatus in an environment dividing data of a file by a chunk unit, constituting a stripe by calculating a parity for a failure recovery, dispersedly storing a parity chunk and a data chunk included in the stripe in multiple data servers, the apparatus comprising:
   a communication unit for receiving the parity chunk constituting the stripe;
   a storage for storing the parity chunk; and
   a control unit for receiving from a separate data server a partial parity calculated by performing an operation between an update data chunk and a previous data chunk, and storing and managing the partial parity,
   wherein the partial parity and the parity chunk are stored and managed in a same data server,
   wherein each data chunk of the file, and each parity chunk are stored in each different data server, and
   wherein storing the data chunk in a storage and transmitting the partial parity to a different data server which manages the parity chunk constituting the stripe are performed by different processes in the separate data server.

7. The data server apparatus of claim 6, wherein the control unit controls storing the partial parity by allocating a buffer for receiving the partial parity, locking an access to a corresponding partial parity chunk file, and releasing an access restriction for the partial parity chunk file after storing the partial parity stored in the buffer in a corresponding segment region of a chunk data region.

8. The data server apparatus of claim 7, wherein the control unit controls returning the allocated buffers to a memory and returning a response to a corresponding partial parity transmitting request.

9. The data server apparatus of claim 7, wherein the control unit performs adjusting a segment information array by extending a segment region, inserting a segment, adding a new segment, or merging with a previous segment in storing the partial parity in the segment region.

10. The data server apparatus of claim 6, wherein the control unit updates the parity chunk using the partial parity.

11. The data server apparatus of claim 10, wherein the control unit locks access to a parity chunk file when receiving a data read failure processing request from a client, transmits a recovered data for a remotely received data chunk after performing a parity update to the client, and releases an access restriction to the parity chunk file.

12. The data server apparatus of claim 10, wherein the control unit performs updating the parity when receiving a data write failure recovering request, and after recovering the previous data chunk based on an update parity chunk, stores a new parity calculated by an operation of the previous data chunk, an update data and current parity data.

13. A parity chunk operating method in an environment dividing data of a file by a chunk unit, constituting a stripe by calculating a parity for a failure recovery, dispersedly storing a parity chunk and a data chunk included in the stripe in multiple data servers, the method comprising:
   storing the data chunk and a parity chunk of the stripe in the multiple data servers;
   generating a partial parity using a previous data chunk and an update data chunk in a storing process of the update data chunk by a first data server storing the data chunk; and
   transmitting the partial parity to a second data server storing the parity chunk by the first data server,
   wherein the partial parity and the parity chunk are stored and managed in a same data server,
   wherein each data chunk of the file, and each parity chunk are stored in each different data server, and
   wherein the storing of the data chunk in a storage and the transmitting of the partial parity to the second data server which manages the parity chunk constituting the stripe are performed by different processes in the first data server.

14. The parity chunk operating method of claim 13, wherein the generating step of the partial parity further comprises performing allocation of a buffer for storing the update data chunk and a buffer for storing the previous data chunk by the data server storing the data chunk.

15. The parity chunk operating method of claim 14, wherein the method further comprises:
   calculating an exclusive-OR (XOR) operation result value between the update data chunk and the previous data chunk as the partial parity; and
   returning the buffer after calculating the partial parity.

16. The parity chunk operating method of claim 13, wherein the method further comprises:
   allocating a buffer for receiving the partial parity by the data server storing the parity chunk;
   locking an access to a corresponding partial parity chunk file;

storing the partial parity stored in the allocated buffer in a segment region corresponding to a chunk data region;

releasing an access restriction to the partial parity chunk file; and returning the allocated buffer to a memory and returning a response to a corresponding partial parity transmitting request.

17. The parity chunk operating method of claim 16, wherein the method further comprises adjusting a segment information array including at least one of extending a segment region, inserting a segment, adding a new segment, and merging with a previous segment in the step of storing the partial parity in the segment region.

18. The parity chunk operating method of claim 13, wherein the method further comprises updating the parity chunk using the partial parity.

19. The parity chunk operating method of claim 18, wherein the method further comprises:

receiving a data read failure processing request from a client;

locking access to a parity chunk file;

recovering data for remotely received data chunks after updating the parity; and transmitting the recovered data to a client and releasing an access restriction to the parity chunk file.

20. The parity chunk operating method of claim 19, wherein the method further comprises:

receiving a data write failure recovering request;

performing the parity update;

recovering the previous data chunk based on the updated parity chunk; and storing a new parity calculated by operation of the previous data chunk, an updated data, and current parity data.

* * * * *